US009440285B2

(12) United States Patent
Teulet (10) Patent No.: US 9,440,285 B2
(45) Date of Patent: Sep. 13, 2016

(54) DEVICE FOR FORMING THIN FILMS AND METHOD FOR USING SUCH A DEVICE

(75) Inventor: Patrick Teulet, Riom (FR)

(73) Assignee: PHENIX SYSTEMS, Riom (FR)

( * ) Notice: Subject to any disclaimer, the term of this patent is extended or adjusted under 35 U.S.C. 154(b) by 97 days.

(21) Appl. No.: 13/384,025

(22) PCT Filed: Jul. 12, 2010

(86) PCT No.: PCT/FR2010/051464
§ 371 (c)(1),
(2), (4) Date: Mar. 15, 2012

(87) PCT Pub. No.: WO2011/007087
PCT Pub. Date: Jan. 20, 2011

(65) Prior Publication Data
US 2012/0164322 A1 Jun. 28, 2012

(30) Foreign Application Priority Data

Jul. 15, 2009 (FR) ..................................... 09 03454

(51) Int. Cl.
*B05D 1/12* (2006.01)
*B05C 19/06* (2006.01)
(Continued)

(52) U.S. Cl.
CPC ........... *B22F 3/1055* (2013.01); *B05C 1/0817* (2013.01); *B05C 11/025* (2013.01);
(Continued)

(58) Field of Classification Search
CPC ........ B22F 3/1055; B22F 3/18; B22F 5/006; B22F 7/02; B23K 26/34; B26K 2201/18; B29C 67/0077; B05C 1/0817; B05C 11/02; B05C 11/021; B05C 11/023; B05C 11/025; B05C 11/026; B05C 11/028; B05C 19/008; B05C 19/06

USPC ....... 118/100, 103, 108, 110, 120, 261, 308; 425/447, 174.4, 218, 219, 472; 264/113, 460, 463, 497; 141/12, 73
See application file for complete search history.

(56) References Cited

U.S. PATENT DOCUMENTS 4,752,352 A * 6/1988 Feygin ............................ 216/33
5,387,380 A * 2/1995 Cima et al. ..................... 264/69
(Continued)

FOREIGN PATENT DOCUMENTS

EP 0776713 A2 6/1997
JP 2001-38274 2/2001
(Continued)

OTHER PUBLICATIONS

Notice of Reasons for Rejection in corresponding JP Application No. 2015-007090 dated Nov. 20, 2015.

*Primary Examiner* — Laura Edwards
(74) *Attorney, Agent, or Firm* — Dowell & Dowell, PC (57) ABSTRACT

The invention relates to a device for forming at least one thin film made of a powder material (14). The device includes a storage area, a deposition area (7), and a cylinder (1) having a circular base for depositing and compacting the powder material (14), the latter having been previously moved from a storage area to a deposition area (7). The device further includes a cylinder (1) having a smooth cylindrical surface, said cylinder being rotatably movable (F1) about the axis of revolution (A) thereof, as well as translatably movable in at least one direction (F5) parallel to a main plane in the deposition area (7), between the storage and deposition (7) areas; a scraper (3) that is movable in a direction perpendicular to the main plane of the deposition (7) area, as well as translatably movable in the same direction (F5) as the cylinder (1), between the storage and deposition (7) areas, the scraper (3) being adapted to move the powder material from one area to another (7).

14 Claims, 7 Drawing Sheets

(51) Int. Cl.

| | |
|---|---|
| *B22F 3/105* | (2006.01) |
| *B05C 11/02* | (2006.01) |
| *B05D 7/00* | (2006.01) |
| *B05C 1/08* | (2006.01) |
| *B05D 1/36* | (2006.01) |
| *B22F 3/18* | (2006.01) |
| *B22F 5/00* | (2006.01) |
| *B23K 26/34* | (2014.01) |
| *B23K 35/02* | (2006.01) |
| *B05C 19/00* | (2006.01) |
| *B22F 7/02* | (2006.01) |
| *B29C 67/00* | (2006.01) |

(52) U.S. Cl.
CPC ............... *B05D 1/12* (2013.01); *B05D 1/36* (2013.01); *B05D 7/50* (2013.01); *B05D 7/52* (2013.01); *B22F 3/18* (2013.01); *B22F 5/006* (2013.01); *B23K 26/34* (2013.01); *B23K 35/0244* (2013.01); *B05C 19/008* (2013.01); *B05C 19/06* (2013.01); *B22F 7/02* (2013.01); *B23K 2201/18* (2013.01); *B29C 67/0077* (2013.01); *Y02P 10/295* (2015.11)

(56) References Cited

U.S. PATENT DOCUMENTS

| | | | | |
|---|---|---|---|---|
| 5,474,719 | A * | 12/1995 | Fan et al. | 264/401 |
| 5,658,412 | A * | 8/1997 | Retallick | B22F 3/1055 156/272.8 |
| 5,730,925 | A * | 3/1998 | Mattes | B22F 3/1055 219/121.73 |
| 5,858,419 | A * | 1/1999 | Haeberli | A45D 33/00 141/12 |
| 5,876,550 | A | 3/1999 | Feygin et al. | |
| 5,902,537 | A * | 5/1999 | Almquist | B29C 41/12 264/308 |
| 5,934,343 | A * | 8/1999 | Gaylo | B22F 3/004 141/12 |
| 6,217,816 | B1 * | 4/2001 | Tang | B28B 1/00 264/426 |
| 6,722,528 | B2 * | 4/2004 | Baumann | F15B 15/06 222/279 |
| 6,764,636 | B1 * | 7/2004 | Allanic et al. | 264/401 |
| 6,767,499 | B1 | 7/2004 | Hory et al. | |
| 8,070,474 | B2 | 12/2011 | Abe et al. | |
| 2001/0044259 | A1 | 11/2001 | Akedo | |
| 2002/0023583 | A1 * | 2/2002 | Kumokita et al. | 118/108 |
| 2002/0093115 | A1 | 7/2002 | Jang et al. | |
| 2002/0145213 | A1 | 10/2002 | Liu et al. | |
| 2003/0059492 | A1 * | 3/2003 | Gaillard | B05C 11/02 425/258 |
| 2005/0263934 | A1 | 12/2005 | Chung et al. | |
| 2007/0245950 | A1 | 10/2007 | Teulet | |

FOREIGN PATENT DOCUMENTS

| | | |
|---|---|---|
| JP | 2002503632 | 2/2002 |
| JP | 2006205456 | 8/2006 |
| JP | 2007-516342 | 6/2007 |

\* cited by examiner

DEVICE FOR FORMING THIN FILMS AND METHOD FOR USING SUCH A DEVICE

BACKGROUND OF THE INVENTION

1. Field of the Invention

The invention relates to a device for forming at least one thin film made of a powder material, used during the action of a laser on said material, and a method for forming thin films using this device.

2. Brief Discussion of the Related Art

Such a device is used during a method, known as laser sintering or laser fusion, for the sintering or fusion of a powder material, using a laser, in a thermal chamber. The term powder material refers to a powder or powder mixture, said powder(s) optionally being metallic, organic or ceramic. Hereinafter, the terms powder or powder material will be used.

FR-A-2 856 614 discloses a device for forming thin films made of a powder material, comprising a cylinder provided with a longitudinal groove. This groove is suitable for taking the powder material in a storage area, moving it to a deposition area and depositing a film of material on said deposition area. After deposition, the cylinder compacts the film using a portion of the surface thereof devoid of a groove. Such a device has a relatively long implementation time. Indeed, between each movement of the cylinder between the storage and deposition areas, i.e. after each powder material film formation and before another film formation, it is necessary to reposition the cylinder such that the groove thereof is in a position wherein it can take the powder material. For this, it is necessary to stop the rotation of the cylinder. Moreover, the surface of the cylinder used for compacting only represents 80% of the total developed surface area, given that the groove is not involved in compacting. For this reason, the length of the film suitable for compacting, in one rotation of the cylinder, is limited to approximately 80% of the circumference of the cylinder.

EP-A-776 713 describes a method for producing a sand mould wherein a cylinder spreads and compacts the sand from a hopper in a plurality of layers on a receiving surface.

US-A-2005/0263934 discloses a device comprising a cylinder protected by a cover, the assembly moving to spread and compact, on a receiving surface, a powder, prior to the sintering thereof by a laser. This powder is supplied by a feed member situated above the cylinder.

These devices do not allow effective spreading and compacting of the powder.

SUMMARY OF THE INVENTION

The invention is particularly intended to remedy these drawbacks by proposing a high-performance and rapid device for forming thin films made of a powder material.

For this purpose, the invention relates to a device suitable for forming at least one thin film made of a powder material comprising a storage area, a deposition area, a cylinder having a circular base for depositing and compacting the powder material, said material having been previously moved from a storage area to a deposition area, characterised in that the device comprises:

a cylinder having a smooth cylindrical surface, said cylinder being rotatably movable about the axis of revolution thereof, as well as translatably movable in at least one direction parallel to a main plane in the deposition area, between the storage area and the deposition area, a scraper that is movable in a direction perpendicular to the main plane of the deposition area, as well as translatably movable in the same direction as the cylinder between the storage and deposition areas, the scraper being suitable for moving the powder material from one area to another.

In this way, using a cylinder devoid of a groove, it is no longer necessary to stop after the formation of each film. Moreover, this film may have a greater length than formed with the grooved cylinder known from the prior art.

According to advantageous, but non-mandatory, aspects of the invention, the device may incorporate one or a plurality of the following features:

the cylindrical surface of the cylinder has an apparent roughness suitable for being less than the grain size of the smallest particles forming the powder material.

The cylindrical surface of the cylinder has an apparent roughness of approximately 0.06 μm.

The sliding friction coefficient of the cylindrical surface on the powder material is suitable for being less than the sliding friction coefficient of the powder material on the surface of the deposition area.

The sliding friction coefficient of the cylindrical surface on the powder material is approximately 0.02.

The scraper and the cylinder are suitable for moving in translation at the same speed.

The movement of the scraper and the cylinder is suitable for being carried out simultaneously, the distance between the scraper and the cylinder being kept constant.

The scraper and the cylinder are suitable for moving in translation at different speeds.

The movements of the scraper and the cylinder are suitable for being carried out non-simultaneously.

A calibration tool suitable for calibrating a film of compacted powder material, after it has been treated with a laser, is arranged in the vicinity of the scraper, so as to precede same when pushing the powder material.

The invention also relates to a method for forming at least one film made of powder material using a device according to any of the above features, characterised in that it comprises steps consisting of:

a) rotating at least one cylinder, upstream from an area for storing the powder material, b) lowering a scraper, c) extracting a predetermined quantity of powder material using the scraper on the storage area, d) pushing the extracted quantity of powder material, using the scraper, from the storage area to a deposition area, e) raising the scraper, f) spreading, using the cylinder, the powder material on the deposition area, g) compacting, using the cylinder, in at least one cylinder passage, the previously spread powder material, h) repeating steps a) to g) to produce the desired number of compacted films.

According to advantageous, but non-mandatory, aspects of the invention, the method may incorporate at least one step where:

Before step g), the method comprises at least one iteration of steps b) to f), in order to spread the powder material in a film of predefined thickness, prior to the compacting thereof After step e) and before step f), the thickness of the material film deposited on the deposition area is at least equal to twice the thickness of the final film of compacted material.

BRIEF DESCRIPTION OF THE DRAWINGS

The invention will be understood more clearly and further benefits thereof will emerge more clearly on reading the following description of two embodiments of a device according to the invention, merely given as an example, with reference to the appended figures wherein.

DESCRIPTION OF THE PREFERRED EMBODIMENTS

Figure 1:
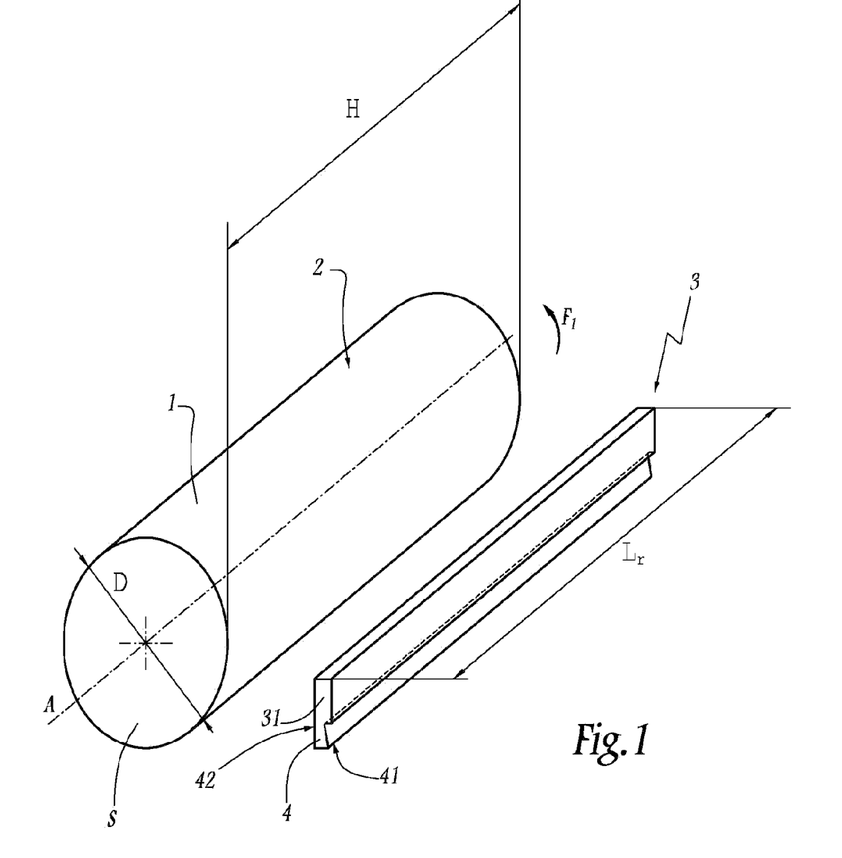
FIG. 1 is a general schematic view of a roller and a scraper according to one embodiment of the invention.

The roller or cylinder 1 represented in FIG. 1 is made of a material that is easy to machine, stable and insensitive to environmental conditions. In particular, the material used is insensitive to the powder material and is stable at the pressure and temperature conditions usually applied during a laser sintering method. In particularly, such a roller 1 should be suitable for not undergoing any deformation in the range of operating temperatures generally encountered, i.e. between ambient temperature and approximately 1200° C. Advantageously, this roller 1 is made of a material suitable for the operating temperature. For example, the roller is metallic, coated with tungsten carbide for use up to 300° C. For use between 300° C. and 600° C., the roller is made of a single material, tungsten carbide. For temperatures between 600° C. and 1200° C., a ceramic, for example alumina or zirconia, is preferably used.

The roller 1 is cylindrical with a circular base. The outer diameter D thereof is dependent on the length, or height H, thereof. It is necessary to have a mechanically rigid roller to produce a film of powder material with a thickness wherein the precision is less than or equal to 10% of the thickness of the film produced. For example, for a 20 μm thick film, the variation in thickness should be less than 2 μm. The cylindrical surface 2 of this revolving cylinder 1 is continuous and smooth, without any bumps or roughness. The apparent roughness Ra of the cylindrical surface 2 is less than the grain size of the smallest particles of the powder material. In this way, the smallest powder particles do not penetrate the hollows of the cylinder surface. The powder does not remain on the cylindrical surface and the powder can be spread. Advantageously, the surface 2 has a glacial polish appearance, i.e. with an apparent roughness Ra in the region of 0.06 μm. This cylinder 1 is mounted, in a manner known per se, to be rotated about the main axis of revolution A thereof. This rotation may be carried out in the direction indicated by the arrow $F_1$ in FIG. 2. In an alternative embodiment, according to the nature of the powder material, the rotation may be carried out in the reverse direction.

In other words, the rotation of the roller 1 may be suitable, depending on the powder material, for being carried out in the trigonometric direction, not shown in FIGS. 2 to 11, or in the inverse trigonometric direction.

This roller 1 is associated with a scraper 3 also shown in FIG. 1. This scraper 3 has a length Lr equal to the height H of the cylinder 1. The scraper 3 comprises a lip 4. The lip 4 comprises an edge 41 formed by the intersection of two plane surfaces according to an angle less than or equal to 90°. The lip 4 is attached to the main body 31 of the scraper 3. The lip 4 is advantageously integral with the body 31. This scraper 3 is made of a material suitable for the operating temperature. In other words, the scraper 3 is, advantageously, made of the same material as the roller 1.

As illustrated schematically in FIGS. 2 to 11, the scraper 3 is mounted on a free edge of the protective cover 5 of the cylinder 1. This mounting is carried out in a removable manner, enabling the replacement, in the event of wear or damage, of the scraper 3. In one alternative embodiment not illustrated, the scraper 3 is permanently attached to the cover 5.

In the embodiment described, the cover 5 has a U-shaped cross-section. The cover 5 covers the cylinder 1 on the entire height H thereof, and on the cross-section S thereof. In other words, this cover 5 partially covers the cylinder 1, while leaving same rotatably movable with a part of the cross-section S extending below the cover 5, via an opening O of the cover 5 facing downwards, i.e. towards the powder material to be spread.

The assembly formed by the scraper 3, the cover 5 and the cylinder 1 is mounted on a frame or carriage, not shown and known per se, suitable for moving in translation between an area 6 for storing powder material and an area 7 for depositing powder material.

Such storage 6 and deposition 7 areas are known from FR-A-2 856 614. In this instance, the storage area is formed by a horizontal plate 6 mounted on a plunder rod 8. This plunger rod 8 is movable in translation, in an upward direction, inside a cylindrical volume having any cross-section. This plate 6 can thus be raised and lowered in a vertical direction, represented by the double arrow $F_2$. The plate 6 is situated upstream from and in the vicinity of a horizontal plate 7 acting as a deposition area and mounted on a plunger rod 9. This plunger rod 9 is also movable in translation, in an upward direction, inside a cylindrical volume having any cross-section. The plate 7 can thus also be raised and lowered in a direction, represented by the double arrow $F_3$, parallel with the direction $F_2$ of movement of the plate 6. In the example, the plate 7 is represented as identical to the plate 6. In one embodiment not illustrated, the shape and dimensions of the plates 6, 7 are different.

Figure 2:
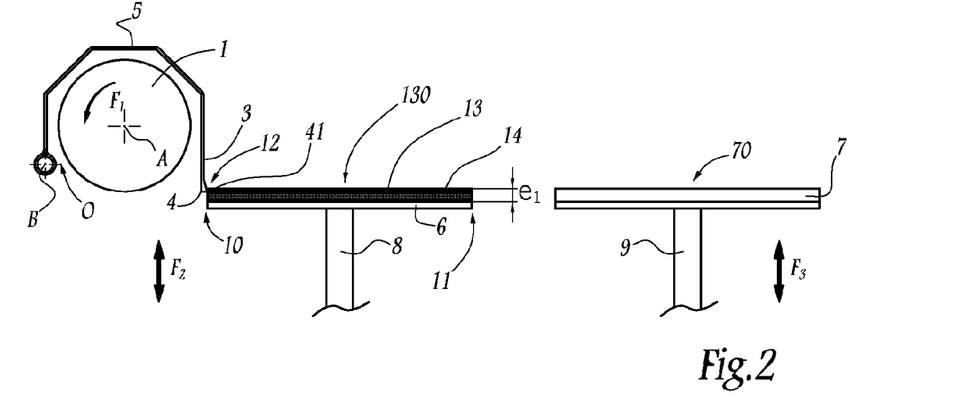
FIGS. 2 to 11 are schematic side illustrations of the implementation of the device, the powder material being represented by a dark line on the storage and deposition areas
Figure 3:
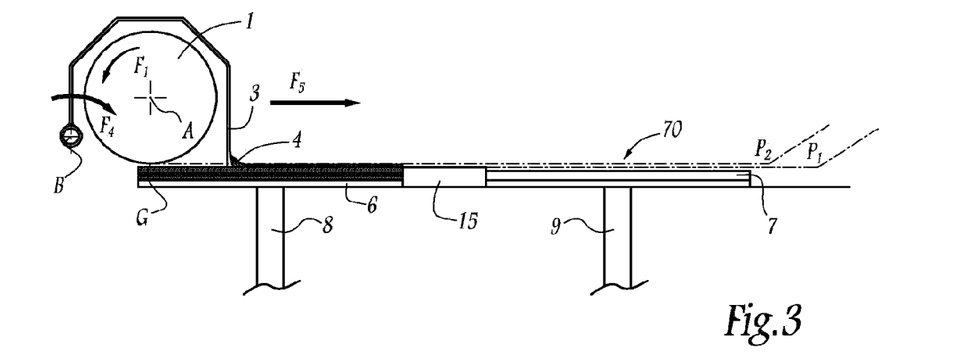

In a first step illustrated in FIG. 2, the roller 1 and the scraper 3 are in a first so-called idle position. In this position, with reference to FIG. 2, they are positioned to the left of one end 10 of the storage plate 6, opposite the nearest end 11 of the plate 7. The scraper 3 is, by the edge 41 of the lip 4, in the vicinity of one edge 12 of any film, or volume, 13 having any initial thickness $e_1$ of powder material 14.

According to the present description, the terms "high", "low", "upper" and "lower" relate to the operating configuration of the equipment shown in the figures. In this way, for example, an "upper" part is facing upwards in these figures.

The upper face 130 of the volume 13 is in a plane parallel with and above the upper face 70 of the plate 7. The cylinder 1 is rotated about the axis A thereof according to a predetermined speed. This rotation $F_1$ is carried out in a trigonometric direction or in an inverse trigonometric direction, depending on the nature of the powder material 14. The rotational speed is dependent on the linear translation movement speed of the carriage whereon the scraper 3, cover 5 and cylinder 1 assembly is mounted. The tangential speed of the cylinder is synchronised with a linear speed of the carriage, in a range of synchronisation ratios that can vary from −100 to 0 and from 0 to 100. The synchronisation ratio is dependent on the physicochemical nature of the powder material.

When the tangential speed of the cylinder is in the same direction as the linear speed of the carriage driving the cylinder, and in a synchronisation ratio of 1, i.e. when the speeds are identical, there is movement of a generatrix of the cylinder 1 on the surface of the powder material 14. The movement speed of a generatrix of the cylinder 1 on the powder material surface is then double the linear speed of the carriage.

When the tangential speed of the cylinder is in the opposite direction of the linear speed of the carriage driving the cylinder, and in a synchronisation ratio of 1, there is no movement of a generatrix of the cylinder on the surface of the powder material. In other words, rotation of the cylinder 1 on a plane is observed, with no sliding of the cylinder on this plane.

The ratio between the tangential speed of the cylinder 1 and the linear speed of the carriage is suitable for the nature of the powder material 14 and the thickness of the films to be produced.

Simultaneously with the rotation of the cylinder 1, the cover 5, and therefore the scraper 3, is lowered. This movement is produced, for example by pivoting along the arrow $F_4$ in FIG. 3, in the opposite direction of the rotation along $F_1$ of the cylinder 1. This pivoting of the cover 5 is carried out about a horizontal axis B. In one embodiment not illustrated, the cover 5 is lowered by a vertical translation movement. The simultaneity of movement of the cylinder 1 and the scraper 3 makes it possible to reduce film formation cycle times. If required, moving of the cylinder 1 and the scraper 3 is offset over time.

The assembly comprising the cylinder 1, cover 5 and scraper 3 is moved in horizontal rectilinear translation. The upper face 130 of the film, or volume, 13 of powder material is situated at a higher height than that of the edge 41, as shown in FIG. 2. For this reason, the scraper 3 extracts a predefined volume of powder material. The movement of the assembly is carried out horizontally, along a direction $F_5$ parallel with a main plane $P_1$ of the plate 7 and in the direction thereof. $P_1$ references a horizontal plane generated by horizontal movement of the edge 41 above the plate 6. Due to the lowering of the cover 5, the plane $P_1$ is situated below a plane $P_2$ tangent to a lower generatrix G of the cylinder 1. In other words, in this position illustrated in FIG. 3, the scraper 3 is suitable for pushing, along the arrow $F_5$ of the extracted powder material 14, below the face 130, in the volume 13, in the direction of the plate 7 without the rotating roller 1 coming into contact with the powder material 14, since the cylinder 1 generatrix G is situated above the plane $P_1$.

The scraper 3 thus pushes a predetermined quantity of powder of the first end 10 of the storage area 6 to the second end 11 thereof. The quantity of powder 14 pushed by the scraper 3 is defined by the difference between the plane $P_1$ and the upper face 130 of the volume 13, it being understood that it is possible to vary this difference by raising or lowering the plate 6.

The translation movement, along the arrow $F_5$, is carried out at a predetermined speed, selected according to the nature of the powder material and/or the desired features of the final layer. In this instance, this speed is generally between 0.05 m/s and 1 m/s for a movement of the cylinder 1 and scraper 3 assembly above the feed area 6.

In this embodiment, the scraper 3 and the cylinder 1 move in translation at the same speed, keeping a constant distance E between them. This is enabled by the presence of a common member, i.e. a carriage, not shown, defining the axes A and B of rotation, respectively, of the cylinder 1 and the cover 5.

In one embodiment, not illustrated, where the scraper 3 is not attached to a member integral with a supporting member of the cylinder 1, the movement speeds of the scraper 3 and the cylinder 1 may be different and vary according to the film formation phases. In other words, the distance E is varied between the cylinder 1 and the scraper 3.

A solid area 15 provided on the frame connects the plates 6, 7 and enables the passage of powder extracted from the volume 13 between the plates 6 and 7. This area 15 is situated in a plane $P_3$ parallel with the plane $P_1$ and below said plane. This plane $P_3$ is defined, in other words, by the lower face of the film of powder material deposited on the plate 7.

Figure 4:
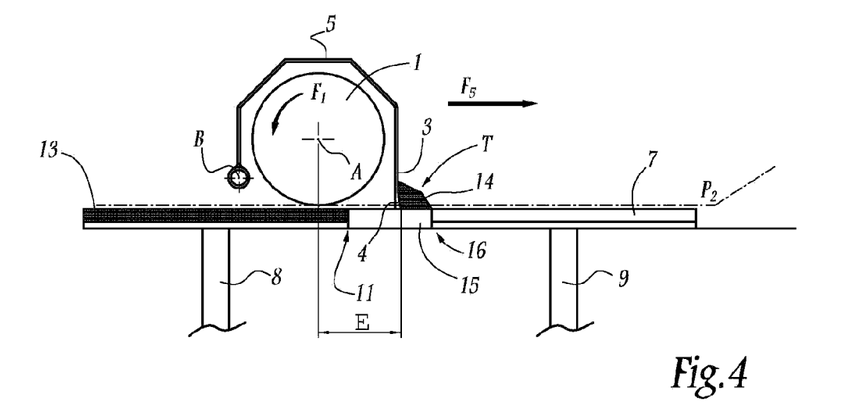
Figure 5:
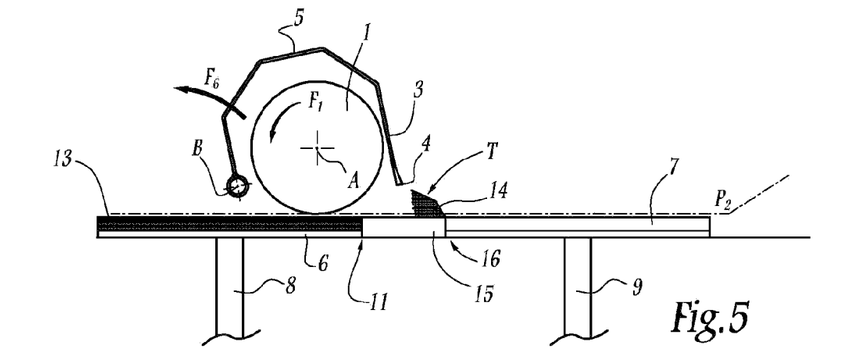

When the scraper 3 has pushed the powder 14 to the end 16 of the plates 7 situated facing the end 11 of the plate 6, as illustrated in FIG. 4, the cover 5 is pivoted about the axis B, in the opposite direction of the first pivoting of the cover 5 and along the arrow $F_6$, to raise the scraper 3. In this position, illustrated in FIG. 5, a pile T of powder 14, representing a predefined quantity, is placed in the vicinity of the end 16, ready to be spread on the deposition area 7.

As the cylinder 1 is rotating about the axis A from the start of the work cycle, i.e. before the scraper 3 is lowered to push the powder 14, there is no idle time for the start-up thereof. The cylinder 1 can immediately be activated, when the scraper 3 is raised. Only raising the scraper 3 requires a stoppage of the translation of the cylinder 1 and cover 5 assembly. Nevertheless, this stoppage time is extremely brief, or non-existent, depending on the synchronisations between the various servo-control devices and/or the envisaged operating speeds.

The cover 5 is raised such that the lip 4 of the scraper 3 is above the pile T of powder 14 and does not impede the action of the cylinder 1.

Figure 6:
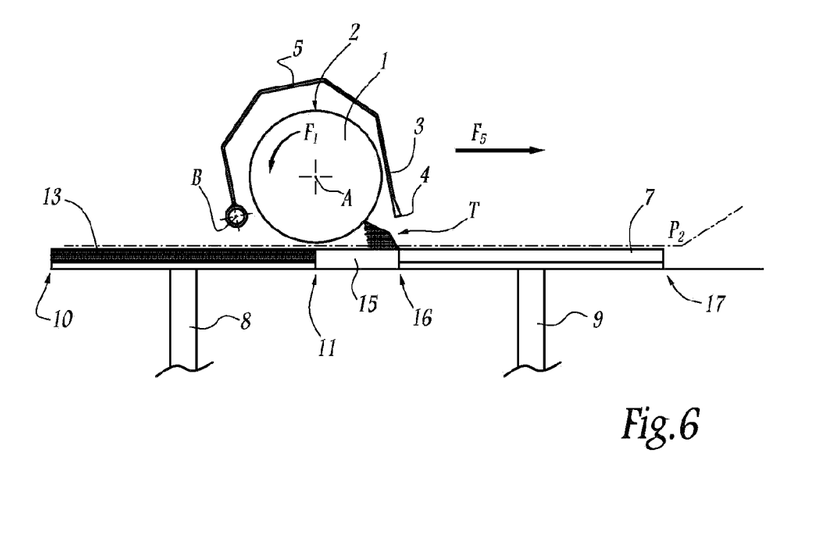

As illustrated in FIG. 6, the roller 1, rotating along $F_1$, makes a horizontal translation movement along $F_5$, from the end 11 towards the end 17 of the plate 7 opposite the end 16, at a given speed, which may be different to that observed during the movement above the area 6. The movement results in the cylinder 1, hitherto situated above the plate 6, to come into contact, by the cylindrical surface 2 thereof, with the pile T.

Figure 7:
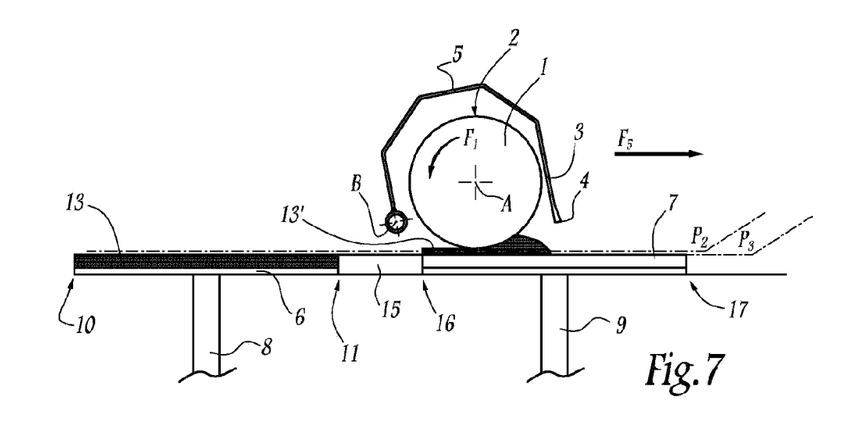

FIG. 7 illustrates the following film formation phase per se or spreading of the powder material 14 on the deposition area 7 using the cylinder 1. This film formation is performed uniformly by translation movement, along the arrow $F_5$, of the cylinder 1 rotating along $F_1$.

During this phase, the cylinder 1 pushes the excess powder 14 back in front of said cylinder. The rotation and movement of the cylinder 1 parallel with the plane $P_1$ makes it possible to spread the powder 14 in a film 13' of a predetermined thickness. The surface 2 of the cylinder 1 is smooth and has a low apparent roughness, similar to that of a glacial polish, preventing any adherence of the powder 14 on the cylindrical surface 2 of the roller 1. This makes it possible to obtain a homogeneous and regular film 13', having a minimum thickness of approximately 1 μm, according to the geometric precision, the surface condition of the cylinder 1 and/or the grain size of the powder. In the example described, the minimum feasible thickness is approximately 5 μm. Films having a thickness greater than 10 μm can also be produced.

During film formation, the cylindrical surface 2 of the cylinder 1 is not in contact with the plane $P_1$ of the film previously sintered or fused using a laser. This lack of contact is dependent, inter alia, on the homogeneity and compactness of the powder film and the grain size and granularity thereof.

The formation of films made of powder material 14 may be carried out in a single iteration, i.e. a single return passage of the cylinder 1 and the scraper 3. According to the physicochemical features and/or the expected quality and/or the predetermined thickness of the spread film, it is possible to perform a plurality of iterations, i.e. a plurality of passages to form the final film of spread powder, before compacting. In this case, films of intermediate thickness between the thickness of the first film and the thickness of the final film are formed.

The thickness of an intermediate film, formed during an iteration n may be subject to a variation defined according to the following function: $(ax+b)/(cx+d)$. It is possible use other types of variation of the thickness between two intermediate films, in order to approach, more or less progressively, the desired final thickness of the film 13' before compacting.

The first passage, i.e. the first iteration, for depositing the first film will now be described, it being understood that the subsequent iterations are similar, until the desired thickness of the powder material film is obtained. Advantageously, the thickness of the film of powder material deposited on the deposition area, prior to compacting, is greater than the thickness of the compacted final film. Preferably, this thickness is at least twice the thickness of the compacted final film.

During this first iteration, the thickness of the layer 13' is greater than the desired thickness of the finished film 13".

Figure 8:
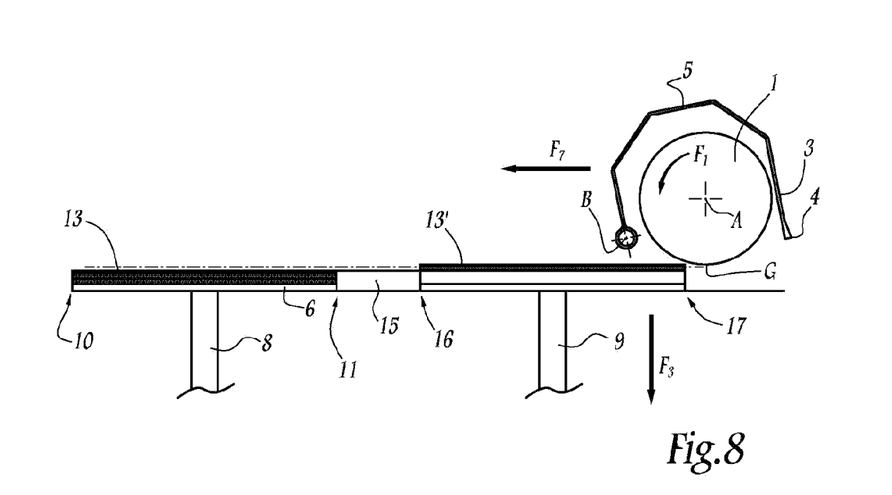

In FIG. 8, the roller 1 has reached the end 17 of the plate 7 and has finished spreading the powder material 14 in a film 13' on the deposition area 7. In this position, the cylinder 1 rotates continuously, and the scraper 3 is raised. The spreading phase is complete.

The cylinder 1, scraper 3 and cover 5 assembly returns to the position occupied in FIG. 6, i.e. at the end 16 of the deposition area 7. During this return, along the arrow $F_7$, rotation of the roller 1 is maintained. Movement along $F_7$ is performed at a higher speed than the initial movement along $F_5$. In an alternative embodiment, the movement speeds, along the arrows $F_5$ and $F_7$, are identical. The movement speeds along the direction $F_5$ may vary between each iteration.

During this return movement, the plunger 9 of the plate 7 is lowered, along $F_3$, by some tens of microns so that the rotating roller 1 does not come into contact with the previously spread film 13'.

Figure 9:
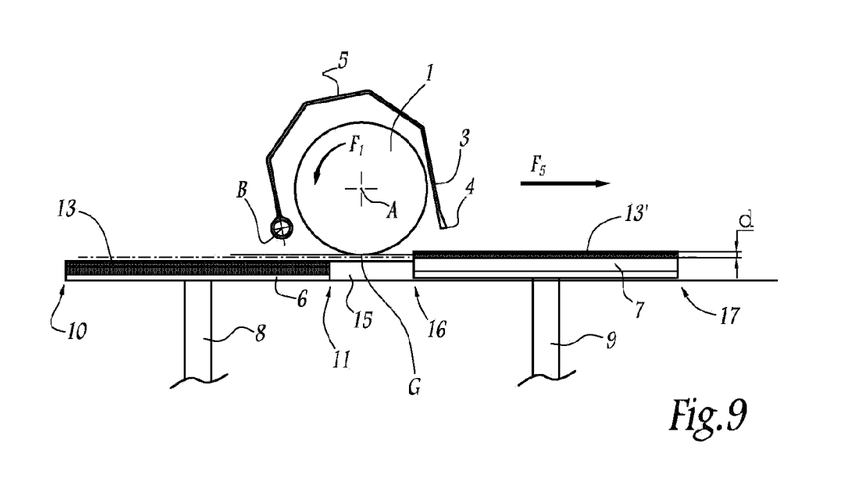

As illustrated in FIG. 9, a second translation movement, along $F_5$, of the cover 5 and cylinder 1 assembly, rotating continuously, compacts the film 13' of previously deposited powder 14. The speed of this movement may be optionally equal to the speeds observed during previous translation movements above the areas 6 and 7. For this, the plunger 9 of the deposition area 7 is raised by a value such that the distance between the lower face of the deposited film 13', i.e. the upper face 70 of the plate 7 when said plate is empty, and a lower generatrix G of the cylinder 1 is equal to the desired final thickness of the film 13".

Figure 10:
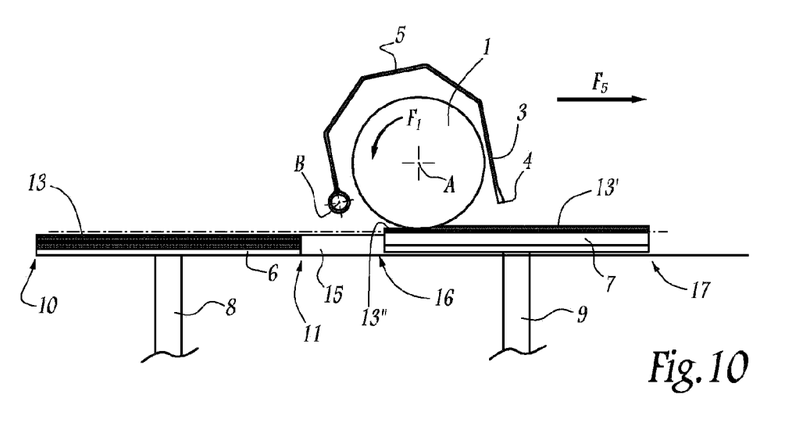
Figure 11:
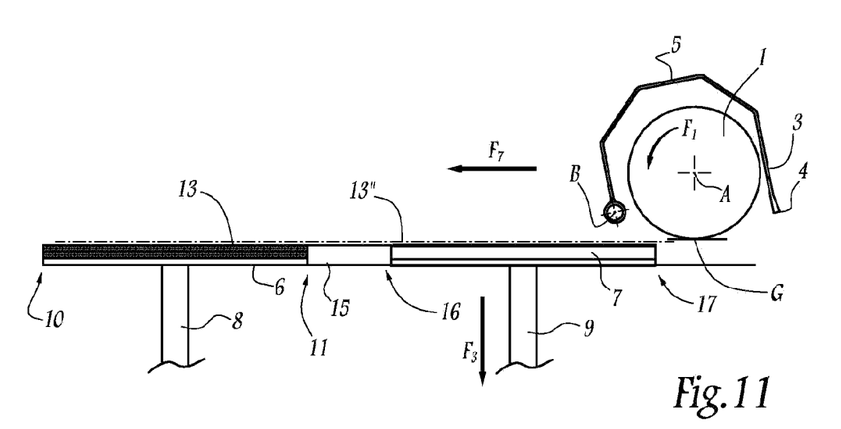

This thickness d may be achieved in a single passage, as illustrated in FIG. 10, by a translation movement along $F_5$, of the rotating cylinder 1, the scraper 3 being held in the raised position. This compacting phase is repeated the number of times required, according to the powder material 14. In particular, the number of passages required to achieve the desired thickness d of the compacted film 13" is dependent on the physicochemical nature of the powder 14, the grain size and/or granularity of said powder. In other words, the mathematical progression intended to achieve the desired thickness d of the film 13" of material 14 is, for example, a decreasing non-linear progression, i.e. of the type $(ax+b)/(cx+d)$. This progression is similar to the progression intended to achieve the predetermined thickness of the spread film.

The compacting to be carried out is calculated on the basis of the thickness of each constituent film of the object to be produced. This thickness is dependent on the height of the object and the desired number of films to produce the object. Due to the powder density variation in a film, the thickness d of the compacted final film is equal to the thickness of a constituent film of the object increased by a fraction of said thickness as a function of a defined compacting ratio.

During compacting, it is necessary for the cylindrical surface 2 of the roller 1 to have a sliding friction coefficient Fg on the powder 14 less than the sliding friction coefficient of the powder 14 on the surface of the deposition area 7. In this way, during compacting, the powder material 14 remains deposited on the deposition area 7 and is not moved by the rotating roller 1. Advantageously, the sliding friction coefficient Fg is approximately 0.02.

When the compacting is carried out, as illustrated in FIG. 10, the roller 1 is situated beyond the end 17 of the deposition area 7, in the same configuration as that represented in FIG. 8. The cylinder 1 rotates continuously, with the scraper 3 raised. On the other hand, compared to the position illustrated in FIG. 8, the cylindrical surface 2 is closest to the upper face 70 of the plate 7.

It is necessary to return the scraper 3 and cylinder 1 assembly to the initial position thereof, i.e. that occupied to take powder material 14 from the storage area 6, as illustrated in FIG. 2. For this, the cylinder 1, rotating continuously, and the cover 5 are returned along a translation movement $F_7$ to the end 10 of the storage area 6.

With some types of ductile powder, it is also possible to spread and/or compact the powder during the movement of the cylinder 1 along the direction $F_7$.

When the cylinder 1 and the cover 5 are at the end 10 of the storage area 6, the scraper 3 is lowered again, along $F_4$, to push another quantity of powder material 14 in another film formation cycle. During this return movement of the cylinder 1 to the initial position thereof, the plunger 9 of the deposition area 7 is lowered again, in order to release the film 13" from the cylinder 1, which is rotating continuously and should not be in contact with the compacted layer 13".

When the film 13" is compacted, it undergoes a laser treatment, not illustrated, i.e. sintering or fusion, enabling the formation of a solid film forming a three-dimensional object.

In a new cycle, it is simply necessary to mount the plunger 8 of the feed area 6 before lowering the scraper 3 to resume a film formation cycle.

Figure 12:
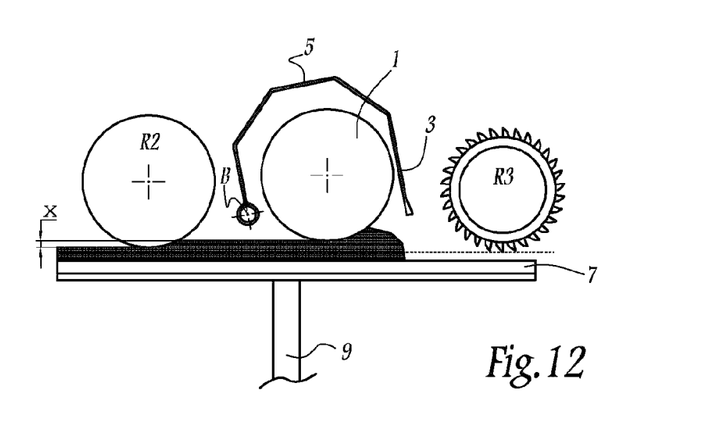
FIG. 12 is a schematic illustration, on another scale, of the implementation of a device according to a second embodiment of the invention.

FIG. 12 illustrates a further embodiment wherein a second cylinder R2, for example identical to the cylinder 1, is arranged in the vicinity thereof. The axes of rotation of the two cylinders 1 and R2 are parallel. The cylinders 1, R2 are arranged such that the respective contact areas thereof, i.e. lower generatrices of the cylinders, are at different heights.

This difference X in height is adapted according to the nature of the powder 14 and the thickness of the compacted film to be achieved. In other words, X is the result of a decreasing non-linear progression of the type (ax+b)/(cx+d).

The presence of this second cylinder R2 thus makes it possible, in a single passage, to carry out compacting which, with a single cylinder 1 would have required two passages. This reduces the time required to obtain a compacted film 13". The rotational speed and/or the direction of rotation of the cylinders 1, R2 are adjustable. These parameters may be optionally identical for both cylinders 1, R2. The same applies for the translation movement parameters of the cylinders 1, R2.

A tool R3 is represented schematically in FIG. 12, in the vicinity of the scraper. It consists of a calibration tool, for example a mill type tool. The tool R3 comprises working parts, in this instance teeth, made of a material having a hardness greater than that of the film 13" after said film has undergone laser treatment, i.e. after the compacted powder material has undergone laser fusion or sintering. This tool R3 is, for example, made of tungsten carbide. The film of compacted powder material treated with a laser is, for more clarity, represented in dotted lines under the single tool R3, it being understood that this film extends under the entire plate 7.

The tool R3 makes it possible, by preceding the scraper 3 when the powder 14 is pushed onto the plate 7 to produce an additional film, to calibrate the previously produced powder film 13", once said film has been treated with a laser.

Indeed, when a previously spread and compacted film, has undergone laser sintering or fusion, irregularities or micro-reliefs may appear on the surface of the film having undergone laser treatment, particularly following the production of objects with undercuts. R3 thus makes it possible to render the surface of this film even, by removing a few mm$^3$ of material, prior to the formation of the subsequent film.

Advantageously, R3 is mounted on the same carriage as the cylinders 1, R2 and the scraper 3. In an alternative embodiment, R3 is mounted removably and/or on another carriage to that supporting the scraper 3 and the cylinders 1, R2.

The speeds of rotation and movement of the tool R3 are suitable for the powder material 14 when said material has been treated with a laser.

The directions of movement of the cylinders R2, 1 and the tool R3 are coordinated.

In a further embodiment, not illustrated, the cylinder 1, cover 5 and scraper 3 assembly are suitable for vertical movement. It is then possible to raise the plunger 8 and lower the cylinder 1, cover 5 and scraper 3 assembly to adjust the quantity of powder 14 to be spread.

The continuous rotation of the roller 1 makes it possible to obtain a rapid implementation of said roller, without stopping the cycle to reposition same.

Since the cylindrical surface 2 is fully used during compacting, it is possible to compact powder films of significant length.

In embodiments not illustrated, the shape of the cover 5 may be different to that described.

In an alternative embodiment, the scraper 3 may be attached to an arm connected to an axis of rotation of the cylinder, said cylinder being devoid of a protective cover.

The invention claimed is:

1. A device for forming at least one film made of powder comprising, a storage area for supporting powder, a deposition area spaced from the storage area and upon which the powder is formed into a thin film, a spreading and compacting cylinder driven by a carriage,
    the spreading and compacting cylinder being rotatable about an axis of revolution (A) and having a circular cross-section and a smooth outer surface with an apparent roughness (Ra) of approximately 0.06 microns, the apparent roughness preventing adherence of powder to the cylindrical outer surface as the spreading and compacting cylinder spreads and compacts the powder, at least one servo-control device for controlling speeds of the spreading and compacting cylinder and the carriage; and
    a pivotably mounted cover disposed over the spreading and compacting cylinder, the cover including a scraper, the scraper being pivotably moved in a direction perpendicular to a main plane (P1) of the deposition area between a lowered position, in which the scraper is movable in translation in a direction generally parallel to the main plane (P1) in order to move a predetermined quantity of powder from the storage area toward the deposition area, and being pivotably moved to a raised upper position spaced above the predetermined quantity of powder, and wherein the spreading and compacting cylinder is thereafter movable in translation to spread and compact the predetermined quantity of powder on the deposition area to form the film.

2. The device according to claim 1, wherein a sliding friction coefficient (Fg) of the cylindrical outer surface on the powder is less than a sliding friction coefficient of the powder on a surface of the deposition area.

3. The device according to claim 2, wherein the sliding friction coefficient (Fg) of the cylindrical outer surface on the powder is approximately 0.02.

4. The device according to claim 1, wherein the scraper and the spreading and compacting cylinder are movable in translation at the same speed.

5. The device according to claim 4, wherein the movements of the scraper and the spreading and compacting cylinder are carried out simultaneously, and a distance between the scraper and the cylinder being kept constant.

6. The device according to claim 1, wherein the movements of the scraper and the spreading and compacting cylinder are in translation at different speeds.

7. The device according to claim 4, wherein the movements of the scraper the spreading and compacting cylinder are carried out non-simultaneously.

8. The device according to claim 1, including a tool for calibrating a thickness of the film of compacted powder, after the film has been treated with a laser, the tool being positioned in a vicinity of the scraper, so as to precede the scraper when the scraper is moving the powder.

9. The device according to claim 8, wherein the tool is a mill.

10. The device according to claim 1, wherein the cylinder and scraper are configured for a movement above a feed area with a speed between 0.05 m/s and 1 m/s.

11. A method for forming at least one film made of powder comprising the steps consisting of:
    a) providing the device of claim 1 which includes the spreading and compacting cylinder which is rotatable, upstream from the storage area for supporting the powder,
    b) lowering the scraper,
    c) extracting a predetermined quantity of powder using the scraper on the storage area, d) pushing the extracted quantity of powder, using the scraper, from the storage area toward the deposition area, e) raising the scraper, f) spreading, using the spreading and compacting cylinder, the powder on the deposition area, and g) compacting, using the spreading and compacting cylinder the previously spread powder to produce a compacted film.

12. The method according to claim 11, including, before step g), at least one iteration of steps b) to f), in order to spread the powder in a film of predefined thickness, prior to compacting the spread powder.

13. The method according to claim 11, including, after step e) and before step f), the thickness of the powder film deposited on the deposition area is at least equal to twice the thickness of a final film of compacted powder.

14. The method of claim 11 including a step of h) of repeating steps a) to g) to produce a number of compacted films.

* * * * *